Oct. 18, 1938.    H. SCHUCHMANN    2,133,670
VOLTAGE MEASURING SYSTEM
Filed Nov. 8, 1935
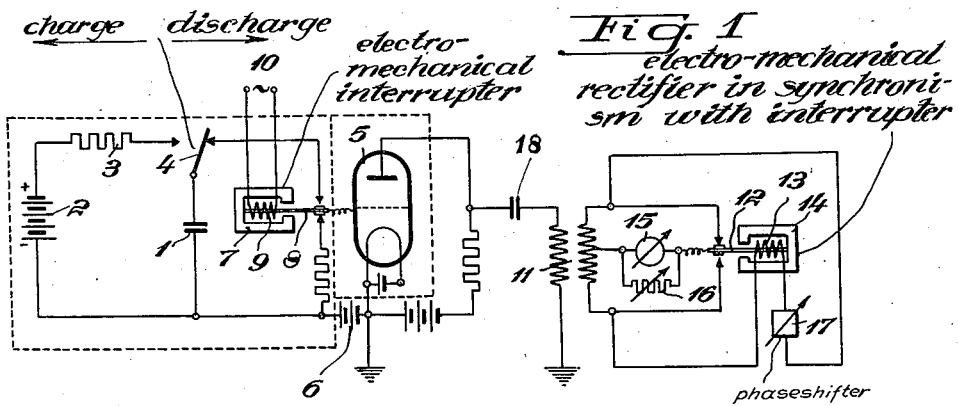
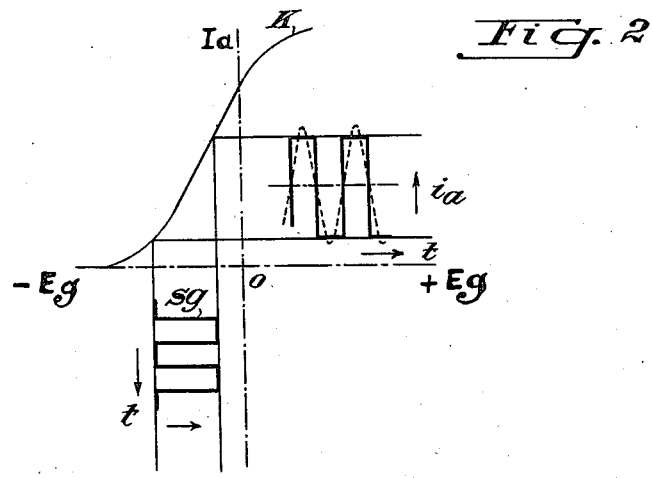
INVENTOR
HANS SCHUCHMANN
BY
ATTORNEYS.

Patented Oct. 18, 1938

2,133,670

UNITED STATES PATENT OFFICE 2,133,670

VOLTAGE MEASURING SYSTEM

Hans Schuchmann, Berlin-Schmargendorf, Germany, assignor to Siemens Apparate und Maschinen Gesellschaft mit beschränkter Haftung, Berlin, Germany, a corporation of Germany Application November 8, 1935, Serial No. 48,843
In Germany November 8, 1934

3 Claims. (Cl. 171—95)

My invention relates to a microchronometer, employed particularly in connection with echo depth sounders, and in which the timing is attained by the measurement of the change in voltage of a condenser which is charged and discharged through a resistance during the time interval to be determined. As a rule and preferably also according to the invention the charging or the discharging of the condenser during the time interval to be measured is based upon a predetermined value of the voltage, so that the voltage of the condenser at the end of the time interval to be determined is a measure of the magnitude of the time interval which has been determined and need only, therefore, be accurately indicated. In most cases and particularly by the use of a microchronometer employed in connection with echo depth sounders, it is desirable to indicate the value of the voltage attained at the end of the time interval to be determined for a relatively considerable time (some seconds). This is, of course, only possible with the aid of a voltmeter which does not consume current. In this case particularly tube voltmeters are, therefore, employed, which, however, owing to the variety of the tube characteristics, present difficulties when a damaged tube must be replaced by another.

The object of the present invention is to provide a microchronometer particularly for echo depth sounders, whereby the above difficulties are eliminated. This object may be accomplished by designing the valve amplifying connection employed for measuring the voltage of the condenser as an alternating current amplifying connection and providing between the amplifier and the measuring condenser, means, for instance, in the form of a mechanical interrupter by means of which the direct-current voltage of the condenser is converted into a periodically varying current voltage with respect to the amplifying tube.

In the accompanying drawing Fig. 1 shows an embodiment of my invention in diagrammatic form, and Fig. 2 is a graph of certain curves referred to hereinafter.

Referring to Fig. 1, 1 denotes the condenser used for the measurement. By the direct-current source 2 of constant voltage, the condenser is charged throughout the resistance 3 and the throw-over switch 4 during the time interval to be measured. At the end of the time interval to be determined the switch 4 is thrown over into the position shown, thereby connecting the condenser 1 to the grid circuit of the amplifying tube 5. A negative biasing potential of the battery 6 is impressed on the grid circuit. 7 denotes the permanent magnet of a mechanical interrupter whose contact blade 8 carries an exciting winding 9 which is fed by an alternating-current source 10. The frequency of the alternating current is such that the contact blade 8 oscillates at about 25 cycles per second. The armature 8 of the interrupter is caused to vibrate by the interaction of magnet 7 and coil 9 which receives current from the alternating current source 10, so that the armature vibrates in accordance with the frequency of said current. The grid is alternately connected at the frequency of the exciting alternating current to the negative biasing potential of the battery 6, and in series with the battery 6 and the condenser 1.

The tube 5 is biased by a high negative potential of such magnitude that the grid will remain negative with respect to the filament even at the highest voltage which may be applied to the grid, consequently the voltage applied to the grid of the tube 5 behaves according to the line sg shown in the diagram of Fig. 2, in which the characteristic of the tube is also represented and designted by K. The variable (intermittent or fluctuating) character of the anode current is represented by the siz-zag line $i_a$ which corresponds substantially to an alternating current such as shown in dash lines in Fig. 2. The variable current might be directly supplied to an alternating-current measuring instrument. With respect to the line sg, the time t is indicated as ordinates and the voltage as abscissae; the reverse arrangement, however, has been adopted as to line $i_a$ representing the variable anode current. However, the arrangement will be more accurate and sensitive, if according to a further feature of the invention the intermittent or fluctuating anode current is converted into a continuous direct current and supplied to a direct-current measuring instrument of the moving coil type. To this end, the primary coil of the transformer 11 is connected to the anode current circuit through a condenser 18. An exciting winding 13 surrounding the contact blade 12 of a mechanical rectifier is fed by the secondary winding of the transformer 11. 14 denotes the permanent magnet of the rectifier. The operation of the rectifier is similar to that of interrupter 7, 8 and 9, but with respect to the rectifier the current for coil 13 is supplied by the amplifier 5, the frequency of which current is determined by that of source 10. A direct-current measuring instrument 15 is connected in a two-way connection to the secondary winding of the transformer. An adjustable shunt resistance 16 is connected in parallel relation to the measuring instrument 15. The mechanical rectifier 12, 13, 14 is thus operated synchronously with the interrupter 7, 8, 9.

In the present embodiment, as illustrated in Fig. 1, the interrupter and rectifier comprise two separate instruments. Such a construction enables the use of phase shifting devices whereby the accurate adjustment of the phase relation between the interrupter and rectifier may be obtained. This adjustment is necessary in order to obtain perfect synchronism because the mere use of the same frequency of the current in both the interrupter and the rectifier insures only that these devices will be in step and does not insure their perfect electrical synchronism. Synchronism requires that the devices be operated not only in step but also in proper phase relation. In the embodiment as shown, the proper phase relation is maintained by the use of a phase shifter device 17 connected in series with the rectifier coil 13.

The operation is as follows:

At the beginning of the time interval during which the measurement is to be made, the condenser 1, which at that moment exhibits a voltage of a certain magnitude, is charged by the current from the battery 2, the switch 4 being in the left-hand position so as to close the circuit through the battery, the condenser, and the resistance 3. The beginning of said time interval may be determined, for instance, by a sound impulse, and the end of said time interval is then determined by the arrival of the echo of said sound impulse. At the end of said time interval, the condenser 1 has acquired, by the charging operation referred to above, a voltage $V_2$ different from its original voltage $V_1$. It is well-known that if a constant charging voltage is applied to a condenser (as in the instant case), the difference between the two voltages $V_1$ and $V_2$ will be a function of the time during which the charging operation continues; thus, if the two limit values $V_1$ and $V_2$ are known or ascertained, there can be determined from them the time interval during which such change of voltage has taken place. Upon the arrival of the echo (that is, at the end of the time interval during which the measurement is to be made), the switch 4 is thrown to the right-hand position shown in Fig. 1, so that the condenser 1 will be in circuit with the grid of the tube 5. This circuit will be opened and closed periodically by the armature 8 of the mechanical interrupter, the said armature being caused to vibrate by the interaction of the magnet 7 with the armature coil 9 which receives current from the alternating current source 10, so that the armature vibrates in accordance with the frequency of such current. The continuous and practically constant direct current supplied by the condenser 1 is thus broken up into discontinuous fragments or current impulses, which together constitute a variable current. These impulses are conducted to the grid of the tube 5, where they are amplified. The anode current of said tube passes by way of the condenser 18 to the primary of the transformer 11, and since this anode current is a variable current, it induces another current in the secondary of said transformer, which secondary current (of alternating character) is conducted to the mechanical interrupter or rectifier 14. The vibrating armature 12 of this rectifier carries a coil 13 in circuit with the secondary of the transformer 11. The rectified current is conducted to the direct-current measuring instrument 15, a variable resistance 16 being arranged in a shunt to said instrument. The voltage indicated by said instrument is a measure of the time interval to be measured.

The two mechanical interrupters operate in perfect synchronism, the particular frequency of their vibrations being immaterial, as long as it is the same for each of the interrupters, and provided also the two interrupters agree in phase, that is to say, the phase of one interrupter should not exhibit any shift relatively to the phase of the other interrupter. In order that this coincidence of phase may be established, I have provided the adjustable phase shifter 17, of any well-known or approved type, by means of which I am enabled to eliminate, or compensate for, any phase difference or shift that may happen to exist between the mechanical interrupter 7, 8, 9 and the mechanical rectifier 12, 13, 14.

As above stated the novel connection has the advantage that the functioning of the microchronometer is independent of the characteristic of the tube employed and that a tube may, consequently, be easily replaced by another. In this case, it is sufficient to adjust the connection only as to a measuring value by correspondingly adjusting the shunt resistance 16, i. e., at a predetermined value of the condenser voltage 1, to cause by adjusting the resistance 16 the pointer of the measuring instrument 15 to move over the scale until the corresponding voltage value is attained.

The novel microchronometer is particularly employed in connection with echo depth sounders. In this connection it is desirable to continuously determine the height or depth to be measured and to continuously indicate the same. In order to attain this it is advisable, as proposed in German Patent 589,368, to use several condensers instead of one. In Fig. 1 is shown only in a diagrammatic form the manner in which the condenser 1 may be charged and connected to the grid of the amplifying tube 5 by throwing over the switch 4. When using a plurality of condensers the change-over or switching of the several condensers, i. e., the cyclic alternation of the functions thereof, may be effected periodically, approximately at intervals of 2 seconds, so that during 2 seconds one condenser is used for measuring and the second for indicating etc.

I claim as my invention:

1. Arrangement for measuring a source of direct current potential, comprising means for converting the D. C. voltage into a uniformly fluctuating voltage of corresponding value, a thermionic tube amplifier having its grid connected to said converting means for amplifying said voltage fluctuations, rectifying means connected into the output side of said amplifier and means for operating said rectifying means in electrical synchronism with said converting means for reconverting the fluctuating amplified current into continuous direct current, and a direct current measuring instrument connected with said rectifying means for indicating the magnitude of the resulting direct current as a measure for the voltage of said direct current potential source.

2. Arrangement for measuring a source of direct current potential, comprising means for converting the D. C. voltage into a uniformly fluctuating voltage of corresponding value, a thermionic tube amplifier having its grid connected to said converting means for amplifying said voltage fluctuations, rectifying means connected into the output side of said amplifier and operating synchronously with said converting means for reconverting the fluctuating amplified current into continuous direct current, and a direct current measuring instrument connected with said rectifying means for indicating the magnitude of the resulting direct current as a measure for the voltage of said direct current potential source, and a variable resistance connected in shunt with said direct current measuring instrument, for calibrating the measure of the indications of the latter in accordance with the amplifying characteristics of said tube amplifier.

3. Arrangement for measuring a source of direct current potential, comprising means for converting the D. C. voltage into a uniformly fluctuating voltage of corresponding value, a thermionic tube amplifier having its grid connected to said converting means for amplifying said voltage fluctuations, a transformer connected with its primary winding into the output circuit of said amplifier, rectifying means connected in circuit with the secondary transformer winding and means for operating said rectifying means in electrical synchronism with said direct current voltage converting means for reconverting the fluctuating amplified current into continuous direct current, and a direct current measuring instrument connected with said rectifying means for indicating the magnitude of the resulting direct current as a measure for the voltage of said direct current potential source.

HANS SCHUCHMANN.